United States Patent [19]

Overstreet et al.

[11] 4,405,975

[45] Sep. 20, 1983

[54] POWER SUPPLY START-UP CIRCUIT

[75] Inventors: Scott M. Overstreet; C. Henning Swenson, both of Los Altos, Calif.

[73] Assignee: GTE Products Corporation, Stamford, Conn.

[21] Appl. No.: 316,158

[22] Filed: Oct. 29, 1981

[51] Int. Cl.³ ............................................. H02M 3/135
[52] U.S. Cl. ............................... 363/49; 315/209 CD; 320/1
[58] Field of Search .............. 307/252 J; 315/209 SC, 315/209 CD, DIG. 5, DIG. 7; 320/1; 323/238, 321, DIG. 908; 361/58; 363/49, 79, 85, 86, 96

[56] References Cited

U.S. PATENT DOCUMENTS

| | | | |
|---|---|---|---|
| 3,193,750 | 7/1965 | Chait | 363/86 X |
| 3,549,851 | 12/1970 | Hockenberry | 320/1 X |
| 3,781,637 | 12/1973 | Potter | 323/908 X |
| 4,092,709 | 5/1978 | Voigt et al. | 323/908 X |

Primary Examiner—William M. Shoop
Attorney, Agent, or Firm—John F. Lawler

[57] ABSTRACT

A power supply start-up circuit for apparatus having a storage capacitor comprises a bistable switch with a trigger terminal and connected between one terminal of a DC source and the storage capacitor, a resistor connected across the switch, a trigger capacitor connected to the trigger lead, and a diode connected between the trigger capacitor and the storage capacitor. The trigger lead on the switch is biased by the trigger capacitor which is charged through the diode to the voltage on the storage capacitor. When the storage capacitor is uncharged at start-up, the switch is biased off and charging current from the DC source to the storager capacitor passes through the resistor permitting a "soft" start, i.e., a gradual charging of the storage capacitor. Thereafter charging of the storage capacitor takes place through the switch when biased on by a voltage differential between storage and trigger capacitors.

6 Claims, 4 Drawing Figures

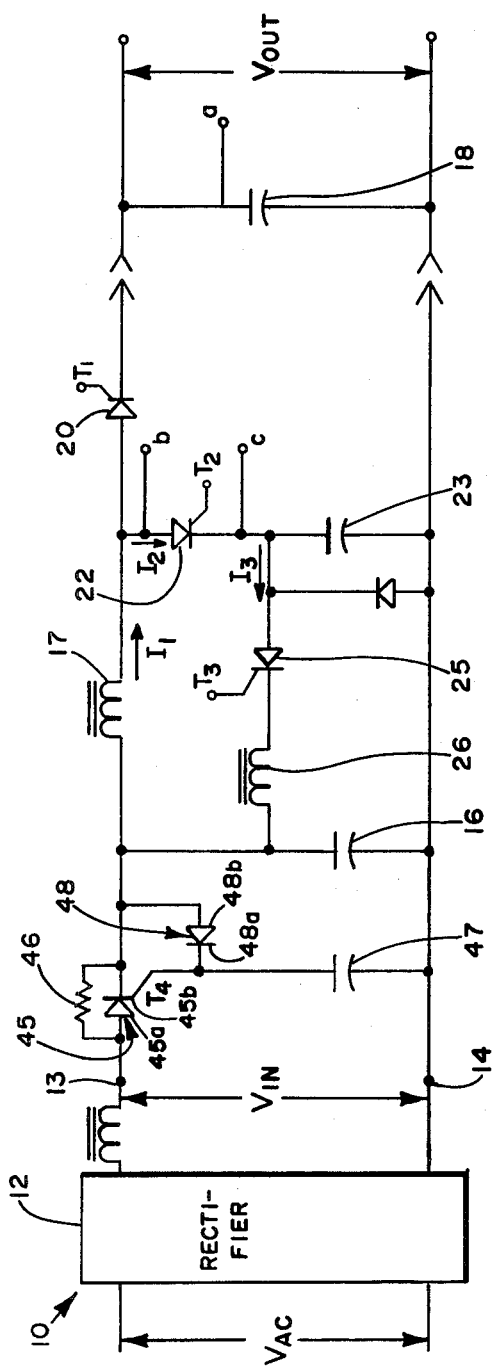
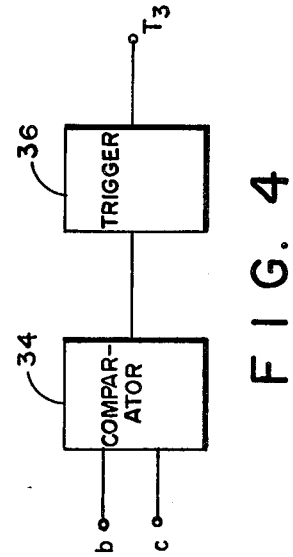
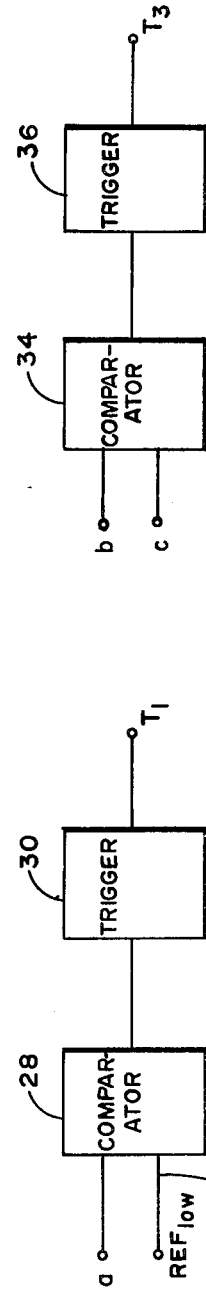
FIG. 1
FIG. 2
FIG. 3
FIG. 4

POWER SUPPLY START-UP CIRCUIT

BACKGROUND OF THE INVENTION

This invention was made under a contract with the Department of the Air Force.

This invention relates to power supplies and more particularly to an improved power supply start-up circuit.

Electrical discharge apparatus such as a pulsed laser system is energized by a power supply which repeatedly charges a charging capacitor forming part of the laser pulse forming network. Such a power supply utilizes a large storage capacitor as a primary source of energy for the charging capacitor. When the power supply is initially energized, the uncharged storage capacitor appears as a short across the power supply terminals causing a current surge which can damage circuit components. To avoid this, a resistor may be connected in series with the storage capacitor to increase its time constant and cause it to charge gradually. The presence of the resistor in the circuit, however, introduces losses during subsequent charge and discharge cycles and results in circuit inefficiencies.

This invention is directed to an improved start-up circuit for such a power supply which avoids this disadvantage.

OBJECTS AND SUMMARY OF THE INVENTION

A principal object of the invention is the provision of a power supply start-up circuit for electrical discharge apparatus which protects the power supply from a line surge on start-up and permits efficient energization of the discharge apparatus thereafter.

A further object is the provision of such a circuit which is simple and economical.

These and other objects of the invention are achieved by a power supply start-up circuit in which the time constant of the storage capacitor is substantially greater upon initial charging of the capacitor than thereafter. A switch responsive to the charge on the storage capacitor operates automatically to effectively connect and disconnect a resistor to and from the capacitor to vary its time constant, and also to provide recharging of the capacitor when its charge falls below a predetermined threshold.

DESCRIPTION OF THE DRAWINGS

FIG. 1 is a schematic diagram of a power supply embodying this invention.

FIGS. 2, 3 and 4 are block diagrams of circuit control elements used with the power supply of FIG. 1.

DESCRIPTION OF PREFERRED EMBODIMENTS

Referring now to the drawings, FIG. 1 depicts a power supply 10 with which this invention may be used and which comprises a rectifier 12 connected to a source of AC voltage and producing at its output terminals 13 and 14 an unregulated DC voltage $V_{In}$. A primary storage capacitor 16 is connected across terminals 13 and 14. An inductor 17 connected in series with terminal 13 and an output charging capacitor 18 connected in parallel with capacitor 16 across terminals 13 and 14 constitutes a resonant charging circuit. Capacitor 18 by way of example may constitute the charging capacitor of a laser pulse forming network. A silicon controlled rectifier (SCR) switch 20 having a trigger lead $T_1$ is connected in series with inductor 17 and capacitor 18 with the anode electrode connected to the inductor as shown.

Circuit operation is such that charging current $I_1$ flows from charged capacitor 16 through inductor 17 and switch 20 into capacitor 18 when trigger lead $T_1$ of switch 20 is energized. As a consequence, the voltage on capacitor 18 rises to $2V_{In}$ which causes current $I_1$ to reverse, thereby opening switch 20, an inherent characteristic of the SCR switch.

In order to achieve cycle by cycle regulation wherein the maximum voltage developed across capacitor 18 on successive cycles is precisely the same, a second SCR switch 22 and an intermediate capacitor 23 are connected in series and across terminals 13 and 14 with the anode of switch 22 connected between inductor 17 and switch 20. Switch 22 has a trigger lead $T_2$ which, when energized, causes switch 22 to close and thereby divert all of charging current $I_1$ to capacitor 23, the diverted current being shown as $I_2$. When switch 22 is triggered on, a DC resonant charging circuit comprising inductor 17 and capacitor 23 is formed.

A third SCR switch 25 having a trigger lead $T_3$ and a second inductor 26 are connected in series with each other between capacitors 16 and 23 with the anode of switch 25 connected between the cathode of switch 22 and capacitor 23. Switch 22 is turned off automatically by the reversal of current $I_2$ when a full charge on capacitor 23 is reached. When switch 25 is triggered, a third resonant circuit comprising capacitor 23 and inductor 26 is formed by which the charge on capacitor 23 is transferred to capacitor 16.

Switch 20 is triggered to the conducting state when the voltage on capacitor 18 falls to a predetermined low threshold. A trigger signal for application to switch terminal $T_1$ is derived by comparing the voltage on capacitor 18 via lead a in a comparator 28, see FIG. 2, such as a differential amplifier, to which a low threshold reference voltage is applied through lead 29. When the voltage on capacitor 18 exceeds the low threshold reference voltage on line 29, an output from comparator 28 is applied to trigger circuit 30 which produces a trigger voltage on terminal $T_1$.

In order to activate switch 22, the voltage on capacitor 18 is similarly applied to comparator 31, see FIG. 3, to which a high or upper threshold reference voltage is applied by lead 32. The value of the reference voltage applied to lead 32 corresponds to a voltage slightly below the maximum charging voltage of capacitor 18 and is the desired output voltage of pulses generated by the pulse forming network of which capacitor 18 is a part. The output from comparator 31 is applied to a trigger circuit 33 which generates an output on terminal $T_2$ of switch 22.

Switch 25 is controlled by the direction of current through switch 22 as determined by terminals b and c connected to comparator 34, see FIG. 4. When capacitor 23 is fully charged by current $I_2$, the current reverses its direction, which condition is sensed by comparator 34 to produce an output that is applied to trigger circuit 36 for generating a trigger voltage on terminal $T_3$ of switch 25.

In operation, assume storage capacitor 16 is charged to the voltage $V_{In}$, that currents $I_1$, $I_2$, and $I_3$ are zero and that the voltage across output capacitor 18 is zero. Since the voltage across capacitor 18 is zero, it is less than low threshold reference voltage on lead 29 of comparator 28, causing the latter to energize trigger signal on lead $T_1$ to turn switch 20 on. Capacitor 16 discharges and current $I_1$ flows into capacitor 18 through inductor 17 and switch 20. Since inductor 17 and capacitor 18 forms a DC resonant circuit, the voltage $V_{Out}$ across capacitor 18 rises toward a peak voltage of $2V_{In}$. When the voltage $V_{Out}$ reaches the predetermined desired voltage (less than $2V_{In}$) which is equal to the high threshold voltage on reference lead 32 (FIG. 3), this condition is detected by comparator 31 which produces an output from trigger circuit 33 to lead $T_2$ to turn switch 22 on. The discharge current of capacitor 16 and inductor 17, shown as $I_2$, is then diverted to intermediate capacitor 23 to charge it. Voltage $V_{Out}$ on capacitor 18 remains at the desired value which is the functional requirement of the circuit.

When switch 22 is triggered to the conducting state, a resonant charging circuit comprising inductor 17 and capacitor 23 is formed. Depending on the energy remaining in inductor 17 and the charge on capacitor 23 when switch 22 is triggered, capacitor 23 charges to a final voltage in excess of $V_{In}$. When current $I_2$ reverses direction in the newly formed resonant circuit, switch 22 automatically turns off. The capacitance of capacitor 16 is much larger than that of capacitor 23 and accordingly, the voltage across capacitor 23 when current $I_3$ reverses is nearly zero. At this final stage of the charge cycle, the excess energy that remains in inductor 17 when the output voltage $V_{Out}$ reaches the final desired value is transferred to input capacitor 16 by a nondissipative path and in such a manner that this excess energy is available for use on the succeeding charging cycle. The circuit conditions are returned to their initial values and the circuit is ready for another charging cycle.

The foregoing power supply does not per se constitute this invention and is merely illustrative of one type of electrical discharge system with which the present invention may be used. The power supply is described and claimed in our copending application Ser. No. 316,157.

In accordance with this invention, in order to prevent current surge damage to rectifier 12 on initial start-up of circuit 10 when the charge on capacitor 16 is zero and in order to permit charging of capacitor 16 as required during operation of the circuit, an SCR switch 45 having a trigger lead $T_4$ has an anode $45a$ connected to terminal 13 and a cathode $45b$ connected to capacitor 16. A shunt resistor 46 is connected across switch 45 as shown. A trigger capacitor 47 is connected between trigger lead $T_4$ and terminal 14 and a diode 48 has a cathode $48a$ connected to trigger lead $T_4$ and an anode $48b$ connected to the common junction of capacitor 16 and inductor 17.

In operation, with no charge on capacitor 16 and with switch 45 in the nonconducting state, energizing of rectifier 12 causes capacitor 16 to charge through resistor 46 which determines the charging time constant of the circuit. With resistor 46 in the circuit, capacitor 16 charges gradually and avoids a damaging surge of current on initial start-up. However, during subsequent operation of the circuit as the voltage on capacitor 16 changes, resistor 46 is effectively removed, from the circuit, as described below, thus eliminating losses and inefficiencies that would result if it were not.

In order to maintain storage capacitor 16 at full charge, switch 45 is triggered on whenever the voltage on capacitor 16 falls below $V_{In}$. Capacitor 47 is charged to the maximum voltage on storage capacitor 16 through diode 48 and thus maintains trigger lead $T_4$ substantially at $V_{In}$. when the voltage on capacitor 16 falls below $V_{In}$, lead $T_4$ goes positive relative to the cathode of switch 45 since diode 48 isolates capacitor 47 from capacitor 16, and switch 45 is turned on. This connects rectifier 12 to capacitor 16 for charging. When capacitor 16 is charged to $V_{In}$, lead $T_4$ is no longer positive relative to the cathode of switch 45 which is thereupon turned off. In this manner, capacitor 16 is maintained substantially at the full charge $V_{In}$ throughout operation of the circuit.

This surge protection circuit has utility and advantage with other power supplies utilizing a capacitor for continuous electrical discharge apparatus and therefore is not limited to use with the above-described power supply.

What is claimed is:

1. In a power supply for electrical discharge apparatus comprising a source of DC voltage having first and second terminals and a storage capacitor connected across said terminals, a start-up circuit comprising
   a bistable switch having a trigger terminal, said switch being connected to said storage capacitor and to said first terminal,
   a shunt resistor connected across said switch,
   a trigger capacitor connected between said second terminal and said trigger terminal, and
   a diode having an anode and a cathode, said anode being connected between said storage capacitor and said switch, said cathode being connected between said trigger capacitor and said trigger electrode.

2. The power supply according to claim 1 in which said switch is a silicon controlled rectifier (SCR).

3. The power supply according to claim 1 in which said switch has an anode and a cathode, said anode being connected to said first terminal, said cathode being connected to said storage capacitor.

4. In a power supply for electrical discharge apparatus comprising a source of DC voltage having first and second terminals and a storage capacitor connected across said terminals, a start-up circuit comprising
   a bistable switch having a first non-conducting state and a second conducting state and connected between said first terminal and said storage capacitor,
   means responsive to said DC voltage in excess of voltage on said storage capacitor during initial start-up of the power supply for maintaining said switch in said first state and thereafter changing said switch to the second state when the voltage on said storage capacitor becomes less than said DC voltage, and
   a shunt resistor connected across said switch,
   said resistor being operatively connected to and disconnected from said storage capacitor when said switch is in the first and second states, respectively, whereby said storage capacitor is initially charged from said source through said resistor and thereafter is charged only through said switch.

5. The power supply according to claim 4 in which said switch comprises a silicon controlled rectifier having a trigger electrode, said electrode being responsive to said means for changing said switch from said first operating state to said second operating state.

6. In a power supply for electrical discharge apparatus comprising a source of DC voltage having first and second terminals and a storage capacitor connected across said terminals, a start-up circuit comprising
- a bistable switch having first and second operating states and connected between said first terminal and said storage capacitor, said switch being responsive to voltage on said storage capacitor for changing from one state to the other, and
- a shunt resistor connected across said switch,
- said resistor being operatively connected to and disconnected from said storage capacitor when said switch is in the first and second states, respectively, whereby said storage capacitor is initially charged from said source through said resistor and thereafter is charged through said switch,
- a diode having an anode and a cathode, said anode being connected between said switch and said storage capacitor,
- a trigger capacitor connected between said second terminal and the cathode of said diode,
- said switch being responsive to the voltage on said trigger capacitor for changing from one operating state to the other.

* * * * *